DANIEL S. SANBORN, INVENTOR.
By [signature] Attorney

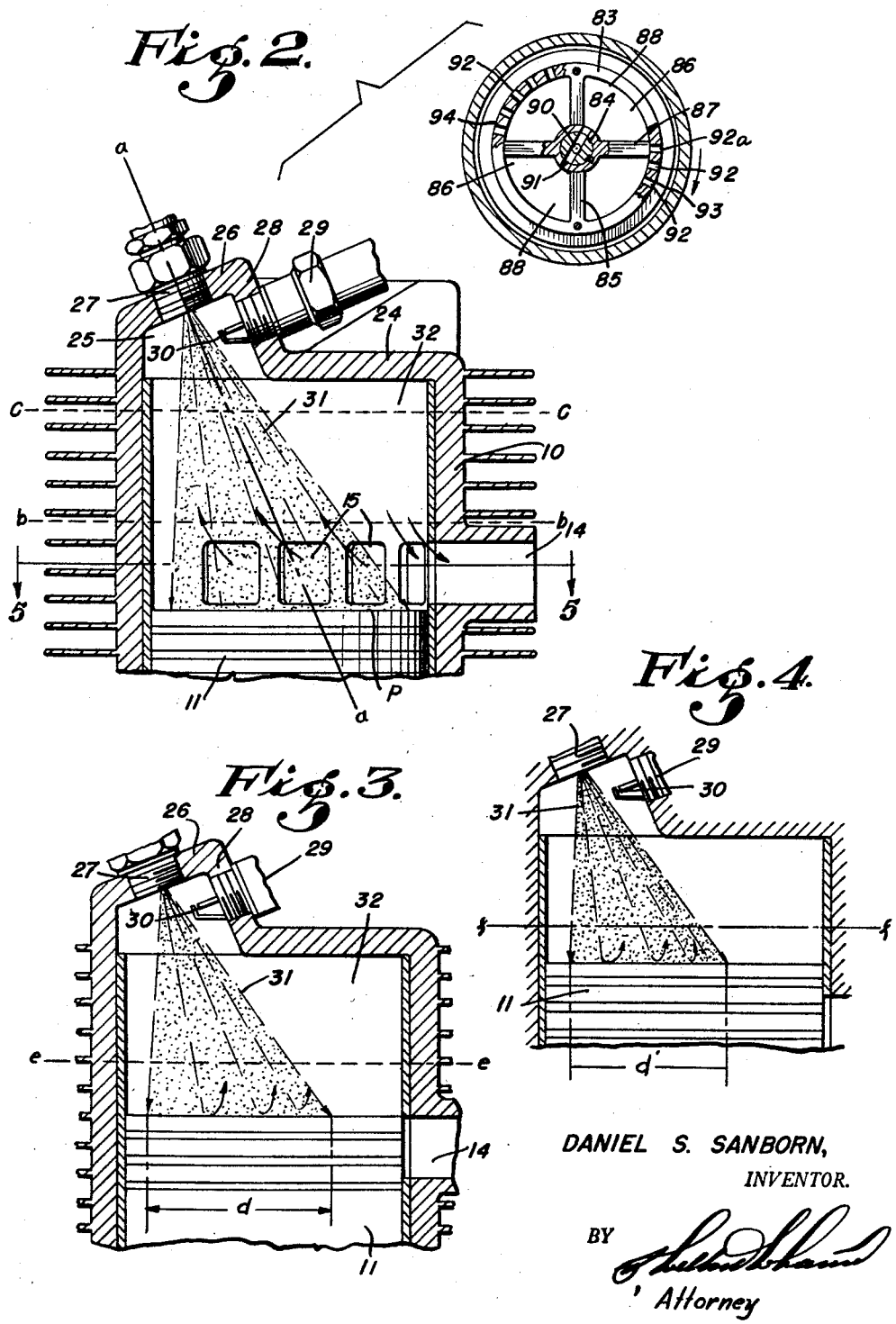

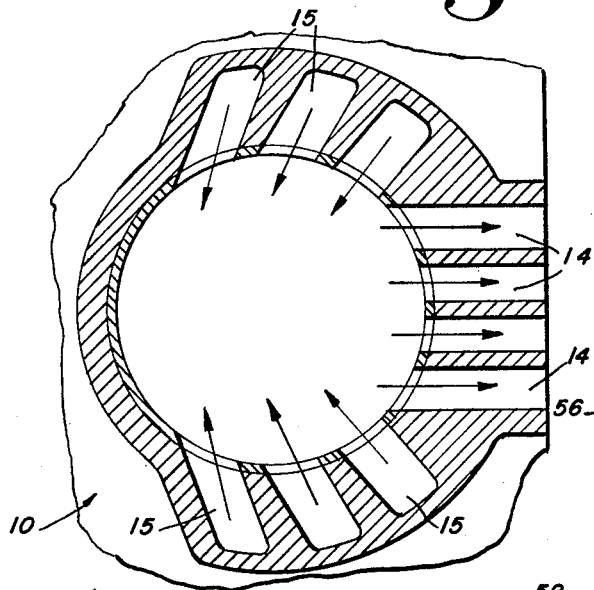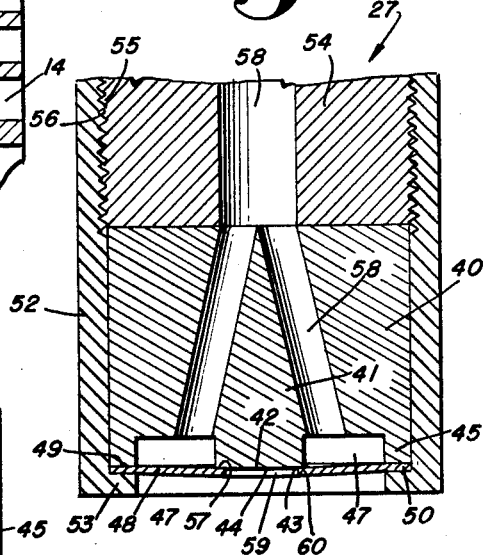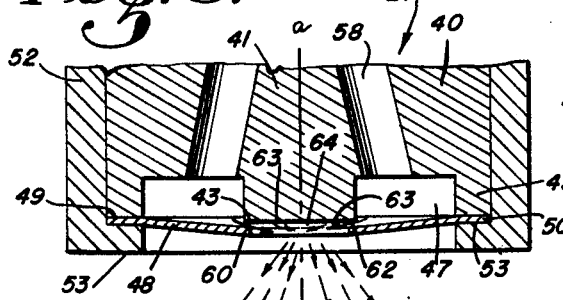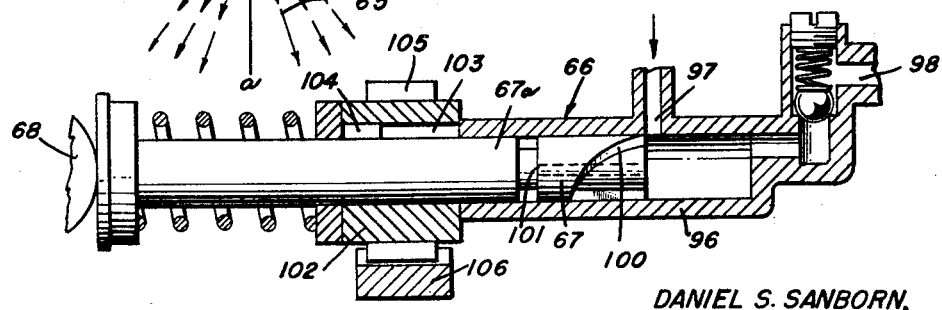

United States Patent Office 2,916,023
Patented Dec. 8, 1959

2,916,023

TWO-STROKE CYCLE ENGINE

Daniel S. Sanborn, San Diego, Calif., assignor to McCulloch Motors Corporation, Los Angeles, Calif., a corporation of Wisconsin Application May 9, 1957, Serial No. 658,134

3 Claims. (Cl. 123—32)

This invention relates to spark-ignition, fuel-injection, two-stroke cycle engines and relates in particular to an engine and a method of operating the same so as to achieve greater efficiency, and smooth, steady power output over the entire speed and load range of the engine. This application is a continuation-in-part of my copending application, Serial No. 417,286, filed March 18, 1954, for Engine.

It is an object of the invention to provide an engine of this character having improved means for the injection of the fuel in a manner to accomplish a more efficient combustion of the fuel-air mixture.

It is another object of the invention to provide a novel spark-ignition, fuel-injection, two-stroke cycle engine in which fuel is injected into the moving fresh air mass within the cylinder at such a time that an approximately stoichiometric fuel-air mixture is formed moving toward the point of spark-ignition, thereby producing an easily ignitable mixture local to the point of spark-ignition when the piston in the cylinder has reached approximately top dead center position, over the entire speed and load range of the engine.

It is another object of the invention to provide a novel method for operating a spark-ignition, fuel-injection, two-stroke cycle engine in which air under pressure is introduced into the engine cylinder in a manner to produce a moving air mass rising upwardly in the cylinder toward the spark-ignition point in the upper end thereof and in which at part load a quantity of fuel corresponding to the reduced load requirements of the engine is injected into the moving air mass in a downward direction to produce a non-uniform fuel-air mixture characterized by the formation of a locally ignitable mixture within the air mass moving upwardly toward the spark-ignition point.

It is a further object of the invention to provide a novel method for operating a spark-ignition, fuel-injection, two-stroke cycle engine in which, for high load requirements, fuel injection is begun shortly after bottom dead center position of the piston and is directed oppositely to the direction of flow of the entering fresh air mass in order to obtain good mixing and complete dispersement of the fuel air mixture within the combustion chamber, and for light load requirements fuel injection is retarded and is directed into the less turbulent air mass during compression of the gases in order to obtain a stratified fuel-air mixture ignitable in the region of the combustion chamber local to the spark plug electrodes.

It is a further object of the invention to provide a method and means for introducing the injected fuel either liquid, vapor or gas, into the cylinder in the form of a filled cone so the fuel will be distributed with greater uniformity in the selected area of the cylinder which varies in magnitude with load conditions.

It is a further object of the invention to provide an engine of the character described having means for producing a conical and distributed injection of the fluid fuel cooperating with other parts so as to produce the improved action herein set forth.

Further objects and advantages of the invention may be brought out in the following part of the specification wherein some details have been described for the purpose of amplifying the disclosure, without intending, however, to limit the scope of the invention which is set forth in the appended claims.

Referring to the accompanying drawings which are for illustrative purposes only:

Fig. 2 is a fragmentary cross-sectional view taken substantially as indicated by the line 2—2 in Fig. 1 and showing approximately the injection of fuel under full load operation;

Fig. 3 is a view showing the cylinder and the piston positioned at the time of fuel injection for reduced power output of the engine;

Fig. 4 is a view similar to Fig. 3, but showing the position of the piston in the cylinder at the time of fuel injection for operation of the engine under idling conditions;

Fig. 5 is a cross section taken substantially as indicated by the line 5—5 of Fig. 2;

Fig. 6 is an enlarged cross-sectional view taken as indicated by the line 6—6 of Fig. 1;

Fig. 7 is an enlarged sectional view of the fuel injector means forming a part of the invention; and Fig. 8 is an enlarged fragmentary sectional view schematically indicating the manner in which the conical injection spray is produced.

Figure 1:
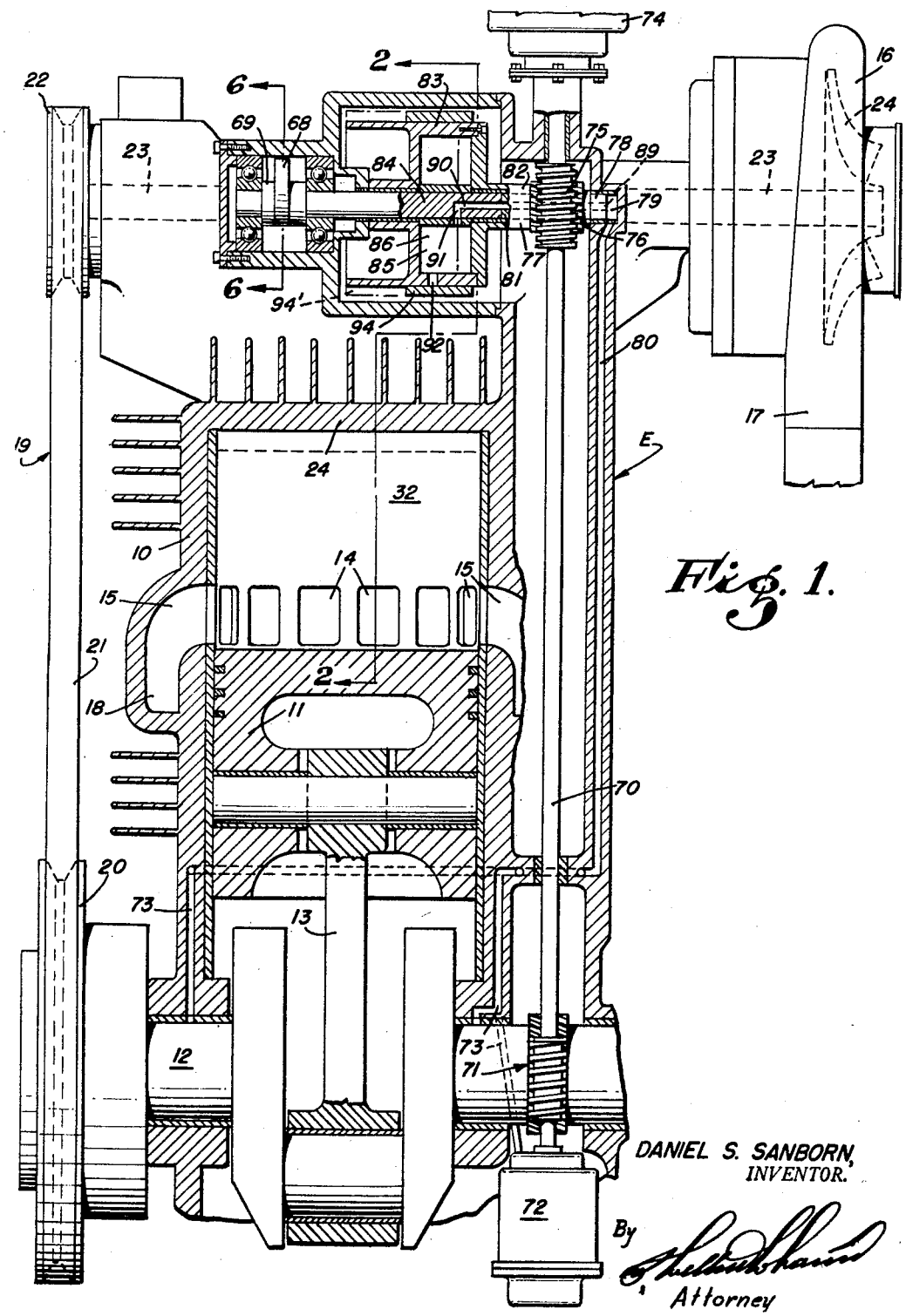
Fig. 1 is a sectional view showing my invention embodied in a single cylinder engine.

The engine E, as shown in Fig. 1, includes a cylinder 10, a piston 11, a crankshaft 12 and a connecting rod 13 for connecting the piston with the crankshaft. Being of two-stroke cycle type the cylinder has exhaust ports 14 and their inlet ports 15 positioned so as to be uncovered by the piston 11 when it reaches the lower end of its movement in the cylinder 10.

A centrifugal compressor 16 is provided for feeding air under pressure through a duct 17 to passages 18 in the engine which communicate with the air inlet ports 15. This air compressor 16 is driven from the crankshaft 12 through a variable speed V-belt drive 19 including a variable diameter sheave 20 mounted on the crankshaft 12, a V-belt 21, and a driven sheave 22 which is mounted on a shaft 23 which is connected to the impeller 24 of the compressor 16.

As shown in Fig. 2, the upper end wall 24 of the cylinder 10 has a downwardly faced recess 25 for the fuel injection and ignition equipment of the engine. The recess 25 is located on the side of the engine opposite from the ports 14 and has in the upper wall 26 thereof a fuel injection nozzle 27 disposed on a center line $a$—$a$ which, if projected downwardly, would intersect the top of the piston 11 at a point P near its center but offset from the piston center toward the side of the cylinder opposite from the injector 27, when the piston 11 is in lowered position. The recess 25 has a sloping wall 28 spaced from the outer wall of the cylinder 10 and therein a spark plug 29 is located and positioned so that the spark gap 30 of the spark plug 29 is located either in or close to the cone 31 defined by the fuel which is injected by the nozzle 27 downwardly and diagonally within the cylinder space 32.

As shown in Fig. 7, the injector nozzle 27 includes a body 40 having at its lower end an outwardly projecting axial abutment 41 which is cylindrical in form and has a substantially flat end face 42. The narrow peripheral portion 43 of the end face 42 constitutes an annular valve seat which may be referred to as a peripheral valve seat circumscribing the area 44 of the end face 42. A short cylindrical marginal wall 45 projects downwardly from the body 40 and cooperates with the abutment 41 to form an annular fuel chamber 47 in surrounding relation to the abutment 41. A circular metal plate or disc 48, originally flat, is secured across the forward or lower end of the body 40 in such a manner that a bending strain will be placed therein because the outer end of the abutment 41 projects further from the body 40 than the end face 49 of the marginal wall 45, so that the annular seat 43 lies in a plane outwardly offset from the plane defined by the end face 49 of the marginal wall 45, resulting in the thin plate 48 being slightly dished when its peripheral portion 50 is clamped against the end face 49.

A sleeve 52 surrounds the body 14 and has a radially inwardly directed lip 53. A second body part 54 rests against the inner end of the body 40 and is provided with external threads 55 onto which may be screwed the internal threads 56 of the sleeve 52, to cause the lip 53 to tightly clamp the peripheral portion 50 of the plate 48 against the end face 49 of the marginal wall 45. The dishing of the plate 48 in the manner described in the foregoing accomplishes a tight engagement of the plate 43 with the corner 57 of the abutment 41 at the periphery of the end face 42 thereof, to give an effective annular sealing of the chamber 47.

A central opening 59 is provided in the plate 48, this opening exposing the area 44 of the end face 42 circumscribed by the peripheral seat 43. The opening 59 of the plate 48 is defined by an inner circular wall portion 60 thereof which overlaps the annular peripheral portion 43 of the end face 42. The bodies 40 and 54 are provided with passages 58 communicating with the annular chamber 47 when the liquid fuel charge is forced under high pressure through these passages into the chamber 47, the plate 48 will be further flexed downwardly, as shown in Fig. 8, so that the annular wall portion 60 thereof will be moved downwardly away from the peripheral portion 43 of the abutment 41, leaving between the parts 43 and 60 an annular spray orifice 62 having an area which is variable in keeping with the rate of flow or volume of the liquid fuel which must be discharged from the nozzle during the extremely short injection time in the operation of the engine. During the injection of the liquid fuel a thin annular sheet of the fuel passes through the orifice 62, as indicated by arrows 63 in Fig. 8, and the inwardly moving fuel is subjected to high turbulence in the small area 64 adjacent the center of the abutment in face 42, and the fuel is subjected to an abrupt change in its direction of flow, resulting in a conical jet of atomized fuel particles along the axis $a$—$a$ as indicated by arrows 65. The injection of the fuel into the cylinder in atomized condition and so as to define a cone 31, Fig. 2, contributes importantly to the high efficiency of the engine under the varying conditions of operation encountered.

For the periodic delivery of fuel charges to the injection nozzle 17 an injector pump 66 is provided having a plunger 67 adapted to be actuated by a cam 68 mounted on a shaft 69 which is rotated in synchronism with the rotation of the engine crankshaft 12, but may be retarded or advanced as operating conditions of the engine may require. Along one side of the cylinder 10 there is a shaft 70 which is driven by the crankshaft 12 through a helical gear set 71. The lower end of the shaft 70 is connected to an oil pump 72 which delivers oil from the crankcase of the engine to a system of passages 73 for the delivery of oil to different parts for the lubrication thereof. The upper end of the shaft 70 is connected to an ignition distributor 74 which in timed relation to the movement of the piston 11 delivers high voltage ignition current to the spark plug 29. A helical gear 75, mounted on the shaft 70 below the distributor 74, drives a companion helical gear 76 which is fixed on a shaft 77 aligned with the shaft 69.

The rightward end 78 of the shaft 77 is supported in a cavity 79 which is connected to the oil passage system 73 of the engine through a passage 80. The leftward end 81 of the shaft 77 has the hub 82 of a cylinder 83 secured thereon. The rightward end 84 of the shaft 69 projects into the cylinder 83, across the interior space thereof and into the hub 82 so as to lie in confronting relation to the leftward end 81 of the shaft 77. As shown in Fig. 2, the cylinder 83 has therein walls 85 which lie in a plane which is parallel to or coincides with the axis of the cylinder 83, and extend from the peripheral wall of the cylinder 83 to the shaft 69, thereby dividing the interior of the cylinder into two semi-cylindrical chambers 86. Vanes 87 projected diametrally from the portion 84 of the shaft 69 in the cylinder 83 into sliding engagement with the inner face of the circumferential wall of the cylinder 83, defining in the chambers 86 compartments 88 which are adapted to receive oil under pressure from the recess 79 through oil passages 89 and 90 respectively in the shafts 77 and 84, and radial ports 91 which connect the leftward end of the passage 90 with the compartments 88.

As viewed in Fig. 2, a plurality of small openings 92 are arranged on helixes in the wall portions 93 of the cylinder 83. Oil fed under pressure through the ports 91 into the compartments 88 will move the vanes 87 in clockwise direction until the inner ends of unobstructed openings are uncovered. Oil will then flow out through these unobstructed openings and there will be no further clockwise rotation of the vanes 87. The selective uncovering of the outer ends of the openings 92, and likewise the covering or obstruction of the openings 92 is accomplished by an outer sleeve 94 which fits around the cylinder and is axially slidable thereon, from the position wherein the sleeve 94 closes all of the openings 92, as shown in full lines in Fig. 1, and the dotted line position 94' wherein all of the openings 92 are uncovered. If all of the openings 92 are uncovered, fluid pressure in the compartments 88 will rotate the vanes 87 until the inner ends of the first openings 92a are uncovered sufficiently to permit escape of oil from the compartments 88 as fast as the oil enters the same, the result being that the vanes 87 will occupy an intermediate position as shown in Fig. 2. If the sleeve 94 is moved so as to cover the first openings 92a, then oil pressure in the compartments 88 will move the vanes further in clockwise direction until the inner ends of unobstructed openings 92 are uncovered. Since the vanes 87 are fixed on the shaft 69 the covering and uncovering of selected openings 92 will rotate the cam 68 relatively to the shaft 77 whereby the position of the cam 68 may be retarded or advanced with respect to the rotation of the engine crankshaft 12.

The injector pump 66 is schematically shown in Fig. 6, since it is of the well known Bosch type having a barrel 96 provided with a fuel inlet opening 97 which is uncovered when the plunger 67 is retracted. Rotation of the cam 68 will move the plunger 67 rightwardly from the position in which it is shown in full lines in Fig. 6, first closing the fuel inlet port 97 and then forcing the fuel from the barrel 96 out through a fuel discharge passage 98 which communicates with the passages 58 of the injection nozzle 27. The rotational adjustment of the cam 68 by relative movement of the vanes 87 within the cylinder 83 makes possible the adjusting of the cam 68 to advance the injection period when the engine is operating at high load and retard the injection period when the engine is operating under other conditions, such as reduced load and idling, for example, as required in the operation of internal combustion engines.

When the engine is operating at full load, the injection is begun at a time shortly after the piston has reached bottom dead center, for example, at a crank angle at about 190° after top dead center position of the piston, and the injection is terminated by the time the top face of the piston has traveled to approximately the quarter way position in the cylinder 10, for example, 25° of crank angle rotation after the starting of the injection period. Injection occurs after the ports 14 and 15 have been uncovered so that the fresh air entering the chamber 32 through the ports 15 has had an opportunity to remove the major portion of the exhaust gases through the exhaust ports 14, and at the time fuel injection is started, the piston is moving upwardly in the cylinder so that the exhaust ports are closed before injected fuel can escape therefrom. Loop scavenging is accomplished by directing the entering fresh air in an upward direction toward the side of the cylinder opposite from the exhaust ports and toward the injection nozzle, thereby establishing a flow of air and exhaust gases up one side of the combustion chamber, across the top of the chamber, and down the opposite side of the chamber to escape near the bottom thereof through the exhaust ports 14.

For full load operation of the engine the vaporized liquid fuel is of such quantity that in order to produce rapid combustion when the ignition spark passes across the spark gap of the plug 29, the atomized fluid must be evenly dispersed throughout the cylinder space.

At part load operation, the timing of the fuel injection is delayed in order to limit the diffusion of the hydrocarbon vapors laterally within the combustion chamber 32. In this way, the hydrocarbon-air proportions exposed to the ignition spark are such that good combustion will be accomplished; whereas, either too high a concentration of hydrocarbon elements at the spark gap or too great dispersion of the hydrocarbon vapors in the cylinder space 32 will result in poor response to ignition as explained. When the engine is operating under full load conditions fuel injection will start after the piston has started upwardly from the bottom center position in which it is shown in Fig. 2 and will terminate when the upper face of the piston 11 reaches a position, such as indicated by the broken line b—b. The conical spray of atomized fuel has an area at its lower end which is substantially the same as the area of the cylinder above the ports 14 and 15, and therefore, the fuel particles are dispersed over a large area corresponding to the area of the upper end of the piston 11 and as the piston 11 continues its upward movement toward top center position hydrocarbon fuel will be quite evenly dispersed across the area of the combustion chamber and a readily ignitable fuel-air mixture will be presented to the ignition spark which appears across the gap 30. Under intermediate load, ignition may start when the piston 11 has reached an intermediate position, such as shown in Fig. 3. At this time the area of the injection cone 31, where it intercepts the upper face of the piston 11, will have a smaller diameter d. The injection cycle which has started when the piston 11 is in the position in which it is shown in Fig. 3 will be discontinued when the upper face of the piston 11 reaches the position indicated by the broken line e—e. The dispersal of the hydrocarbons laterally within the cylinder space 32 will be diminished to such an extent that when the piston reaches a position close to top dead center, or ignition position, a stoichiometric fuel-air mixture will be presented to the spark created at the spark gap 30.

Under minimum conditions of power delivery by the engine, injection of the fuel charge into the cylinder will not start until the piston 11 reaches the position in which it is shown in Fig. 4, and the injection of fuel will terminate shortly thereafter, or when the upper face of the piston 11 reaches the position indicated by the line f—f. The area of the injection cone 31, where it intercepts the upper face of the piston 11, will have a smaller diameter d'. There will be a minimum lateral dispersal of the small amount of hydrocarbon fuel injected due to reduced mixing time and air motion, and the fuel air proportions presented to the ignition spark when the piston 11 reaches approximately dead center will be of such proportions as to be readily ignited by the spark.

To accomplish the timing and duration of the injection periods the plunger 67 of the injection pump 66 has, in operative relation to the inlet port 97 a spiral cutoff shoulder 100 and a circular pressure release shoulder 101. Viewed from the rightward end thereof, clockwise rotation of the plunger 67 from the position in which it is shown in Fig. 6, will circularly move the cutoff shoulder 100 with relation to the inlet port 97 so that the cutting off or closing of the port 97 by the plunger 67 will be delayed proportionately to the rotation of the plunger 67. Rotation of the plunger 67 is controlled by a rotatable member 102 which surrounds the stem 67a of the plunger 67 and has therein a longitudinal slot 103 or keyway into which a lug 104 projects from the face of the stem 67a. The rotatable member 102 has a gear 105 formed thereon engaged by a rack 106 so that by movement of the rack 106 by either automatic or manually operable means will effect rotation of the member 102 which will be transmitted through the lug 104 to the plunger 67. The details of the distributor 74 are not shown for the reason that this distributor may be of a type commonly used on internal combustion engines, having means for advancing and retarding of the time at which the high voltage, spark forming current is delivered to the spark plug.

I claim:

1. In a two-cycle, fuel injection, spark ignition engine: a cylinder side wall having exhaust and air inlet ports at the lower end of the cylinder space defined by the cylinder wall; a cylinder top wall; a piston operative in said cylinder; an injector nozzle in said cylinder top wall characterized by delivering a conical spray of fuel downwardly into the cylinder space toward said piston, said nozzle comprising a body having in the lower end thereof a centralized abutment, a fuel receiving space around said abutment, ducts for conveying the fuel from the exterior to said fuel receiving space, and a thin plate positioned across said lower end of said body so as to cover said fuel receiving space, said plate having therein a spray opening smaller in diameter than the diameter of said abutment and confronting the face of said abutment whereby an annular spray orifice is formed between the end face of said abutment and the contiguous portion of said plate, which will effect an atomization of the fuel as it leaves said opening of said plate in the form of a cone; spark means in the top portion of said cylinder space adjacent said injector nozzle; and means for delivering separate charges of fuel to said nozzle, said fuel delivery means operating in timed relation to the movement of said piston in said cylinder and having means for varying the size of said charges between minimum and maximum and for delaying the delivery of said charges to said nozzle in correlation to the movement of said piston in said cylinder so that the injection of said maximum charges will start when said piston is near the bottom of its compression stroke and the charges of progressively decreasing size are delayed for periods of time corresponding to progressively upwardly spaced positions of said piston as it moves through tis compression stroke, to effect lateral distribution of the fuel particles of the injected fuel charges over areas in the cylinder space varying from maximum to minimum as the sizes of said charges are varied from maximum to minimum.

2. In a two-cycle, fuel injection, spark ignition engine: a cylinder side wall having exhaust and air inlet ports at the lower end of the cylinder space defined by the cylinder wall, said inlet port being arranged so as to deliver air upwardly in the side portion of said cylinder space opposite from the side of the cylinder containing said exhaust port; a cylinder top wall; a piston operative in said cylinder; an injector nozzle in said cylinder top wall at the upper end of said side portion of said cylinder space characterized by delivering a conical spray of fuel downwardly into the cylinder space toward said piston, said nozzle being set angularly so that the axis of the conical spray delivered thereby will intersect a near-central point in the top of said piston, when it is in lowered position in the cylinder, said nozzle comprising a body having in the lower end thereof a centralized abutment, a fuel receiving space around said abutment, ducts for conveying the fuel from the exterior to said fuel receiving space, and a thin plate positioned across said lower end of said body so as to cover said fuel receiving space, said plate having therein a spray opening smaller in diameter than the diameter of said abutment and confronting the face of said abutment whereby an annular spray orifice is formed between the end face of said abutment and the contiguous portion of said plate, which will effect an atomization of the fuel as it leaves said opening of said plate in the form of a cone; spark means in the top portion of said cylinder space adjacent said injector nozzle; and means for delivering separate charges of fuel to said nozzle, said fuel delivery means operating in timed relation to the movement of said piston in said cylinder and having means for varying the size of said charges between minimum and maximum and for delaying the delivery of said charges to said nozzle in correlation to the movement of said piston in said cylinder so that the injection of said maximum charges will start when said piston is near the bottom of its compression stroke and the charges of progressively decreasing size are delayed for periods of time corresponding to progressively upwardly spaced positions of said piston as it moves through its compression stroke, to effect lateral distribution of the fuel particles of the injected fuel charges over areas in the cylinder space varying from maximum to minimum as the sizes of said charges are varied from maximum to minimum.

3. In a two-cycle, fuel injection, spark ignition engine: a cylinder side wall having exhaust and air inlet ports at the lower end of the cylinder space defined by the cylinder wall; a cylinder top wall; a piston operative in said cylinder; an injector nozzle in said cylinder top wall characterized by delivering a conical spray of fuel downwardly into the cylinder space toward said piston, said nozzle comprising a body having in the lower end thereof a centralized abutment, a fuel receiving space around said abutment, ducts for conveying the fuel from the exterior to said fuel receiving space, and a movable member positioned across said lower end of said body so as to cover said fuel receiving space and having therein a spray opening smaller in diameter than the diameter of said abutment and confronting the face of said abutment whereby an annular spray orifice is formed between the end face of said abutment and the contiguous portion of said movable member, which will effect an atomization of the fuel as it leaves said opening of said movable member in the form of a cone, said member being movable away from said abutment by fluid pressure in said fuel receiving space; spark means in the top portion of said cylinder space adjacent said injector nozzle; and means for delivering separate charges of fuel to said nozzle, said fuel delivery means operating in timed relation to the movement of said piston in said cylinder and having means for varying the size of said charges between minimum and maximum and for delaying the delivery of said charges to said nozzle in correlation to the movement of said piston in said cylinder so that the injection of said maximum charges will start when said piston is near the bottom of its compression stroke and the charges of progressively decreasing size are delayed for periods of time corresponding to progressively upwardly spaced positions of said piston as it moves through its compression stroke, to effect lateral distribution of the fuel particles of the injected fuel charges over areas in the cylinder space varying from maximum to minimum as the sizes of said charges are varied from maximum to minimum.

References Cited in the file of this patent

UNITED STATES PATENTS

| 1,139,898 | Newcomb | May 18, 1915 |
| 1,997,173 | Gosslau et al. | Apr. 9, 1935 |
| 2,086,427 | Mock | July 6, 1937 |
| 2,724,371 | Mallory | Nov. 22, 1955 |

FOREIGN PATENTS

| 818,526 | France | June 21, 1937 |